United States Patent
Christopher et al.

(10) Patent No.: US 12,318,873 B2
(45) Date of Patent: Jun. 3, 2025

(54) WELDING SYSTEMS WITH A ROLLING SUPPORT BASE HAVING A BRAKE

(71) Applicant: Illinois Tool Works Inc., Glenview, IL (US)

(72) Inventors: Mark Richard Christopher, Neenah, WI (US); Connor Denis Uitenbroek, Appleton, WI (US); Adam Richard Schmitz, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 148 days.

(21) Appl. No.: 17/851,707

(22) Filed: Jun. 28, 2022

(65) Prior Publication Data
US 2023/0415277 A1  Dec. 28, 2023

(51) Int. Cl.
*B23K 37/02* (2006.01)
*B60T 1/04* (2006.01)
*B60T 7/10* (2006.01)

(52) U.S. Cl.
CPC ...... *B23K 37/0247* (2013.01); *B23K 37/0205* (2013.01); *B23K 37/0282* (2013.01); *B23K 37/0294* (2013.01); *B60T 1/04* (2013.01); *B60T 7/102* (2013.01)

(58) Field of Classification Search
CPC ....... B60T 1/04; B60T 7/102; B23K 37/0247; B23K 37/0205; B23K 37/0294; B23K 37/0282
See application file for complete search history.

(56) References Cited

U.S. PATENT DOCUMENTS

| | | | |
|---|---|---|---|
| 5,035,445 A | 7/1991 | Poulin | |
| 5,390,942 A | 2/1995 | Schuster | |
| 5,685,227 A * | 11/1997 | Gaccetta | B66C 9/18 188/42 |
| 6,409,187 B1 | 6/2002 | Crow, Jr. | |
| 6,834,869 B1 * | 12/2004 | Adams | B62B 3/14 280/33.994 |
| 2007/0080511 A1 * | 4/2007 | Campbell | B62B 9/02 280/47.131 |
| 2015/0210113 A1 | 7/2015 | Yang | |
| 2018/0304113 A1 * | 10/2018 | Goldish | A63B 22/0694 |
| 2019/0329365 A1 * | 10/2019 | Simon | B23K 37/0282 |

FOREIGN PATENT DOCUMENTS

| | | | |
|---|---|---|---|
| CA | 3147579 A1 * | 8/2022 | ............ B23K 9/125 |
| CN | 206254165 U * | 6/2017 | |
| CN | 211991524 | 11/2020 | |
| DE | 102017106974 | 10/2018 | |
| EP | 4000951 | 5/2022 | |

OTHER PUBLICATIONS

European Office Communication with extended European Search Report Appln No. 23181085.4 dated Oct. 24, 2023.

* cited by examiner

*Primary Examiner* — Tan Le
(74) *Attorney, Agent, or Firm* — McAndrews, Held & Malloy, Ltd.

(57) ABSTRACT

A welding sled, comprising a support base comprising one or more attachment points for attachment of a wire supply support and attachment of a wire drive assembly; a plurality of rollers coupled to a bottom of the support base; and a brake configured to selectively brake the welding sled.

7 Claims, 8 Drawing Sheets

WELDING SYSTEMS WITH A ROLLING SUPPORT BASE HAVING A BRAKE

FIELD OF THE DISCLOSURE

This disclosure relates generally to welding systems and, more particularly, to welding systems with a rolling support base having a brake.

BACKGROUND

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control.

A wire feeder is operationally connected to the power source and is designed to deliver consumable wire to a weld. Often times, it is desirable that a welding system, including any wire feeder, be portable to support various welding operations outside of a shop or plant setting. The system may be required to undergo movement from multiple locations in any given day. In general, some welding feeders have been supplied with a fixed base plate or an accessory option of being placed on a cart with a power source. The systems may have a relatively great mass which, combined with their configuration, present difficulties to operators while transporting the system around a job site, as they are often difficult to move. Improved systems are desirable.

SUMMARY

Welding systems with a rolling support base having a brake are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

Welding-type power, as used herein, refers to power suitable for welding, plasma cutting, induction heating, electrode preheating, CAC-A and/or hot wire welding/preheating (including laser welding and laser cladding).

The present disclosure will be described with respect to a welding system with a dolly including a wire feeder of a MIG welding system. However, the present disclosure is applicable to power sources and various welding systems, for example, power sources for TIG, stick, flux cored, and the like welding systems. Moreover, the present disclosure is also applicable to supports for non-welding, high power systems such as plasma cutters and induction heaters, and other mechanical systems and components (including non-welding related systems) that may be positioned on a support structure such as a cart or sled.

Disclosed example welding sleds include: a support base comprising one or more attachment points for attachment of a wire supply support and attachment of a wire drive assembly; a plurality of rollers coupled to a bottom of the support base; and a brake configured to selectively brake the welding sled.

In some example welding sleds, the brake includes: a contact pad configured to selectively extend through the support base to contact one or more of the rollers; and an actuator accessible from a top or a side of the support base and configured to: actuate the contact pad to contact the one or more of the rollers to apply a braking force to the one or more of the rollers; and actuate the contact pad to move out of contact with the one or more of the rollers.

In some examples, the contact pad is a flat pad configured to apply pressure against the one or more of the rollers. In some examples, the contact pad is a wedge configured to apply pressure to two rollers of the plurality of rollers between the two rollers. In some examples, the contact pad is configured to extend through a top surface of the support base. In some examples, the contact pad is configured to extend through a side surface of the support base.

In some example welding sleds, the plurality of rollers includes at least one roller that is not braked by the contact pad. In some examples, the plurality of rollers includes at least five rollers. In some example welding sleds, the actuator includes a lever configured to actuate the contact pad to contact the one or more of the rollers when a handle of the lever is pushed in a first direction to an engaged position. In some examples, the lever is configured to actuate the contact pad to move out of contact with the one or more of the rollers when the handle of the lever is pushed in a second direction to a released position.

In some example welding sleds, the brake further includes: a biasing element configured to bias the contact pad to apply the braking force to the one or more rollers; and a lever configured to disengage the contact pad from the one or more rollers when a handle of the lever is pushed in a first direction, and to allow the biasing element to move the contact pad into contact with the one or more rollers when the level is released. In some example welding sleds, the brake includes an contact pad and an arm rotatably coupled to the support base, and configured to rotate between a braked position in which the arm holds the contact pad in contact with a support surface on which the support base is located, and a released position in which the arm holds the contact pad out of contact with the support surface.

Disclosed example welding systems include: a support base having one or more attachment points for attachment of a wire supply and attachment of a wire drive assembly; a wire drive assembly attached to the support base; a wire supply support attached to the support base and configured to support a wire supply spool; a plurality of rollers coupled to a bottom of the support base; and a brake configured to selectively brake the welding system.

In some example welding systems, the brake includes: a contact pad configured to selectively extend through the support base to contact one or more of the rollers; and an actuator accessible from a top or a side of the support base and configured to: actuate the contact pad to contact the one or more of the rollers to apply a braking force to the one or more of the rollers; and actuate the contact pad to move out of contact with the one or more of the rollers.

In some example welding systems, the contact pad is at least one of a flat pad configured to apply pressure against the one or more of the rollers, or a wedge configured to apply pressure to two rollers of the plurality of rollers between the two rollers. In some example welding systems, the contact pad is configured to extend through a top surface of the support base. In some example welding systems, the contact pad is configured to extend through a side surface of the support base.

In some example welding systems, the actuator includes a lever configured to actuate the contact pad to contact the one or more of the rollers when a handle of the lever is pushed in a first direction to an engaged position. In some example welding systems, the lever is configured to actuate the contact pad to move out of contact with the one or more of the rollers when the handle of the lever is pushed in a second direction to a released position. In some example welding systems, the brake further includes: a biasing element configured to bias the contact pad to apply the braking force to the one or more rollers; and a lever configured to disengage the contact pad from the one or more rollers when a handle of the lever is pushed in a first direction, and to allow the biasing element to move the contact pad into contact with the one or more rollers when the level is released.

In some example welding systems, the brake includes an contact pad and an arm rotatably coupled to the support base, and configured to rotate between a braked position in which the arm holds the contact pad in contact with a support surface on which the support base is located, and a released position in which the arm holds the contact pad out of contact with the support surface.

Figure 1:
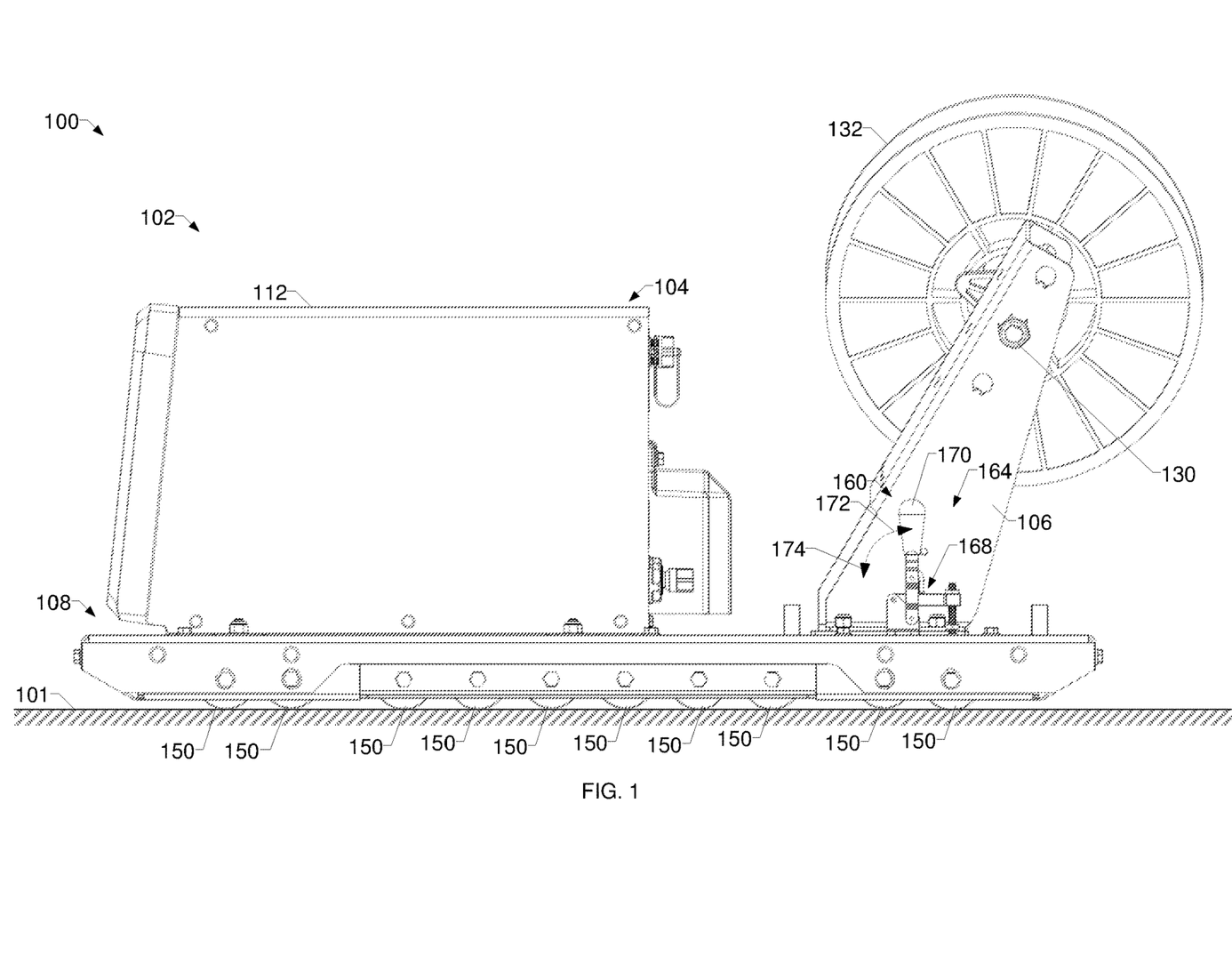
FIG. 1 is a side elevation view of an example welding system having a rolling support base with a levered brake, in accordance with aspects of the present disclosure.
Figure 2:
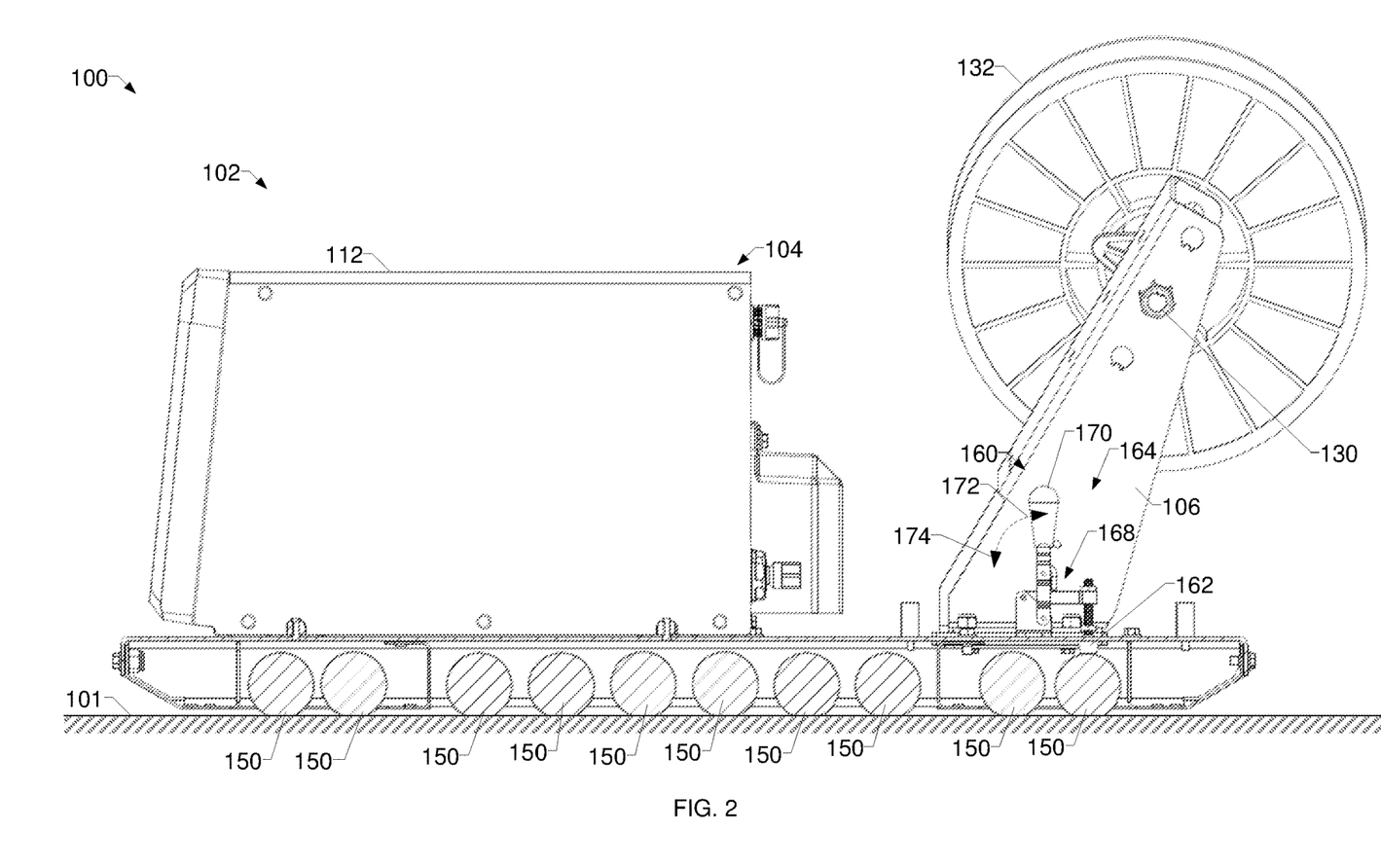
FIG. 2 is a cutaway side elevation of the example welding system of FIG. 1.
Figure 3:
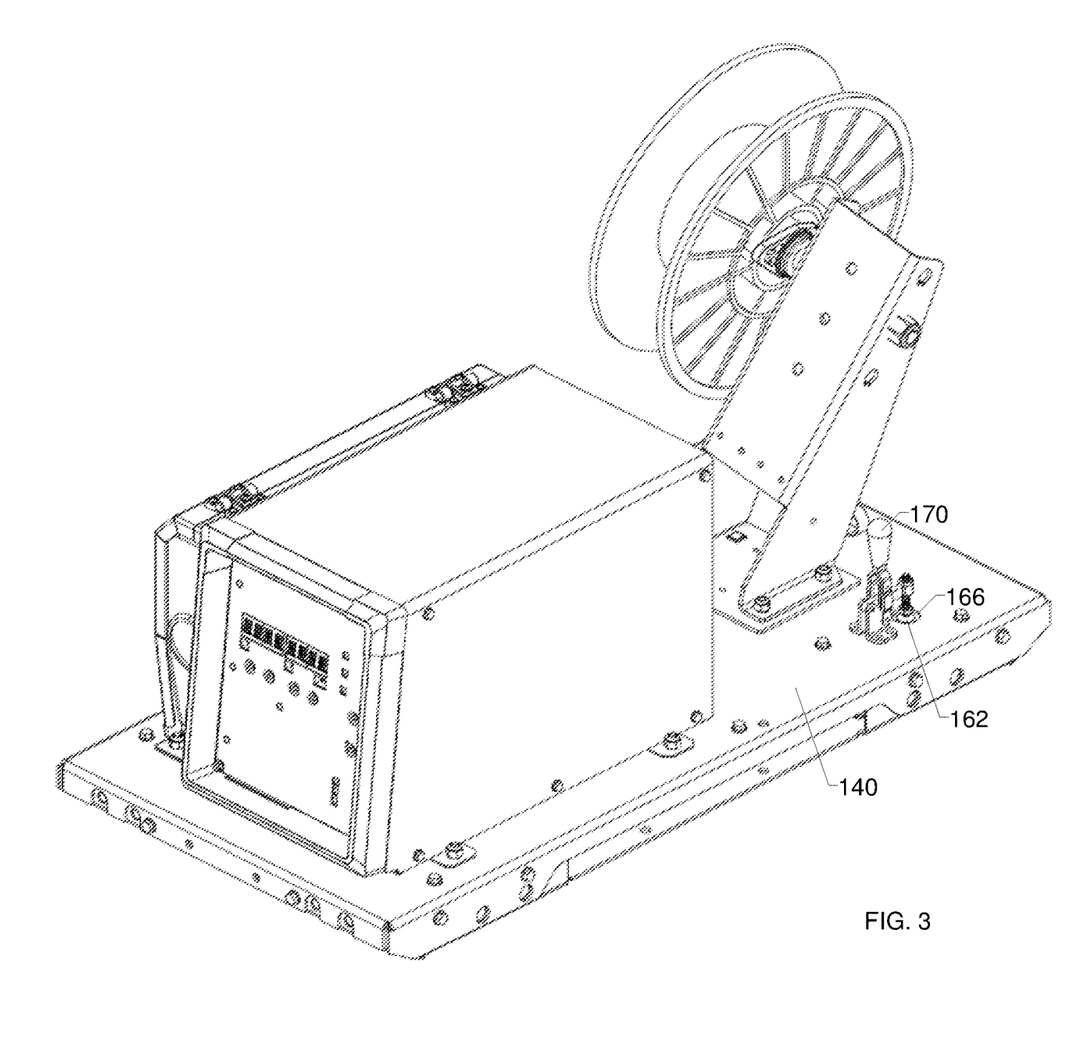
FIG. 3 is a perspective view of the example welding system of FIG. 1.

FIG. 1 is a side elevation view of an example welding system 100 having a rolling support base 108 with a levered brake 160. FIG. 2 is a cutaway side elevation of the example welding system 100 of FIG. 1. FIG. 3 is a perspective view of the example welding system 100 of FIG. 1.

The example welding system 100 of FIGS. 1-3 includes a wire feeder 102 with a drive assembly 104 and a wire supply support 106, and a support base 108. The drive assembly 104 of the wire feeder 102 includes rollers or gears (not shown) to advance consumable welding wire from a wire reel mounted to the wire supply support 106 to a welding torch or gun. In the illustrated example, the drive assembly 104 is protected by a housing 112. In other examples, additional components of the wire feeder 102 may be positioned in the housing 112. For example, the wire supply support 106 may be positioned in the housing 112 with the drive assembly 104 (e.g., a briefcase wire feeder).

Power is supplied to the wire feeder 102 by a welding power source (not shown) through a weld cable (not shown). The power source is designed to run in various modes, such as voltage-controlled, or current-controlled, and is further configured to power other welding systems and to provide auxiliary power to various accessories. The power source is designed to condition raw power supplied from a utility line or engine driven power supply and output power usable by the welding process. The output of the power source is generally controlled by a controller and associated operational circuitry that regulates the secondary or output side of the power conditioning components. A gas supply line (not shown) connects the wire feeder to a gas source or cylinder to provide shield gas for welding operations.

A welding gun or torch (not shown) connects to the wire feeder 102 via a wire guide line. The welding torch is configured to supply consumable welding wire to a workpiece. Control signals are transmitted between the torch and the wire feeder 102 via a control line (not shown). The welding torch may be equipped with a trigger or other input device that, when manipulated, causes a transceiver of a controller (not shown) in the housing 112 of the wire feeder 102 to transmit control signals to the power source through weld cable or separate communications cable.

The wire supply support 106 in the example of FIG. 1 includes a reel or a hub 130 that rotatably supports a spool 132 of welding wire (welding wire not shown). Wire is drawn from the spool 132 by the drive assembly 104. The spool 132 rotates to allow additional wire to be unwound from the spool as the wire is drawn through the drive assembly 104. While a spool of wire is depicted, other sources of wire may be utilized by wire feeder 102, for example, a free spool, a container or box with spooled wire, or any other desirable source of welding wire usable by a drive assembly. Additionally or alternatively, the hub 130 and the spool 132 may have a different orientation with respect to the plate 140, and/or the orientation and/or position of the hub 130 and the spool 132 may be adjustable.

The drive assembly 104 and wire supply support 106 are supported by a sled or support base 108. The support base 108 rigidly connects the drive assembly and the wire supply support together to ensure proper orientation to perform a welding operation, and to allow the feeder to be transported. In the embodiment depicted, the drive assembly 104 and the wire supply support 106 are supported on a support plate 140 of the support base 108. The drive assembly 104 and the wire supply in the embodiment shown are mounted to the plate, for example, bolted to the plate, welded to the plate, or the like.

The example welding system 100 may include one or more handles, attachment points, and/or any other structures to allow an operator to grasp and manipulate the welding system 100.

The support base 108 includes a set of rollers 150 which enable the welding system 100 to be easily pulled or pushed along a support surface 101 (e.g., via a handle). The example rollers 150 may be low-friction rollers. The rollers 150 are coupled the support base 108 via support rails and/or other support structures on a bottom of the support base 108. In contrast with wheels or casters, the rollers 150 are relatively low friction and have a length that is substantially longer than the radius. Rollers 150 generally have lower rolling friction than wheels or casters having the same radius, and/or may enable a larger distribution of load than wheels or casters of the same radius. In disclosed examples, the welding system 100 includes at least five of the rollers 150 to provide stability and load distribution.

Because the rollers 150 are a relatively low friction, the rollers 150 may allow the welding system 100 to roll at unintended times in the presence of a graded support surface. Such unintended rolling may be problematic for an unsuspecting operator who is performing a weld or is otherwise not attending to the welding system 100. To resist or prevent unintended movement of the welding system 100 via the rollers 150, the example welding system 100 further includes a brake 160 to selectively increase rolling friction.

The example brake 160 of FIGS. 1-3 includes a contact pad 162 and an actuator 164. The contact pad 162 extends through the support base 108 (e.g., through a hole 166 in a top of the support plate 140, through a hole or aperture in a side of the support base 108, etc.). When pressure is applied between the contact pad 162 and one or more of the rollers 150, the contact pad 162 applies a braking force to the contacted ones of the rollers 150.

The example contact pad 162 of FIGS. 1-3 is a rubber foot arranged to apply pressure to one of the rollers 150. However, other implementations of the contact pad 162 may include a tapered or wedge shape to fit between two rollers 150, a flat plate shape to contact one, two, three, or more rollers, and/or any other effective geometry for applying braking force to one or more of the rollers 150.

The example actuator 164 of FIGS. 1-3 is a lever 168, which actuates the contact pad 162 to contact one or more of the rollers 150 when a handle 170 of the lever 168 is pushed or pulled in a first designated direction 172. To actuate the contact pad 162, the example lever 168 includes an upper pivot pin 176 and a lower pivot pin 178. As the handle 170 is moved in the first direction 172, the upper pivot pin 176 moves directly over (or slightly past) the lower pivot pin 178 and locks the contact pad 162 in contact with the rollers 150. The lever 168 also actuates the contact pad 162 to move out of contact with the one or more rollers 150 when the handle 170 is moved in a second designated direction 174 (e.g., opposite the first designated direction 172). As the handle 170 is moved in the second direction 174, the upper pivot pin 176 is moved out of the vertical position with respect to the lower pivot pin 178, and the contact pad 162 is released from contact with the rollers 150 and is moved out of contact with the rollers 150 via the connection between the handle 170 and the contact pad 162. In the example of FIGS. 1-3, the handle 170 is arranged such that it can be easily manipulated in either direction 172, 174 by a hand and/or foot of the operator.

The contact pad 162 may be adjustable with respect to the actuator 164, such as to adjust the pressure applied by the contact pad 162 to the roller(s) 150 when the actuator is in a braking position. For example, the contact pad 162 may be attached to a bolt or threaded stud, which is adjustable with respect to the lever 168 by adjusting the extension of the contact pad 162 from the lever 168 via the bolt or threaded stud (e.g., using nuts to secure the bolt or threaded stud, or having threads in the lever 168).

Figure 4:
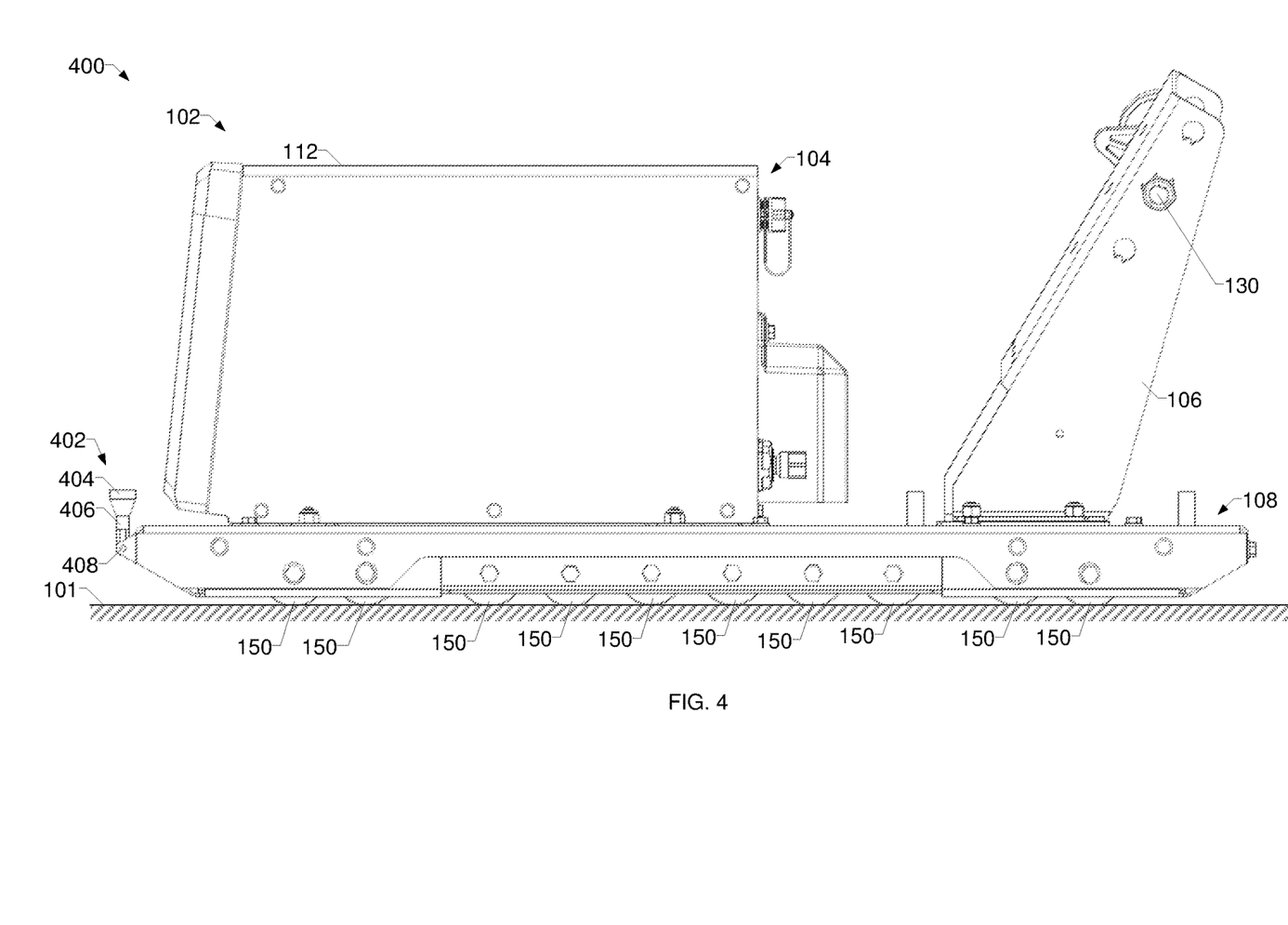
FIG. 4 is a side elevation view of another example welding system having a rolling support base with a levered brake in an unbraked position, in accordance with aspects of the present disclosure.
Figure 5:
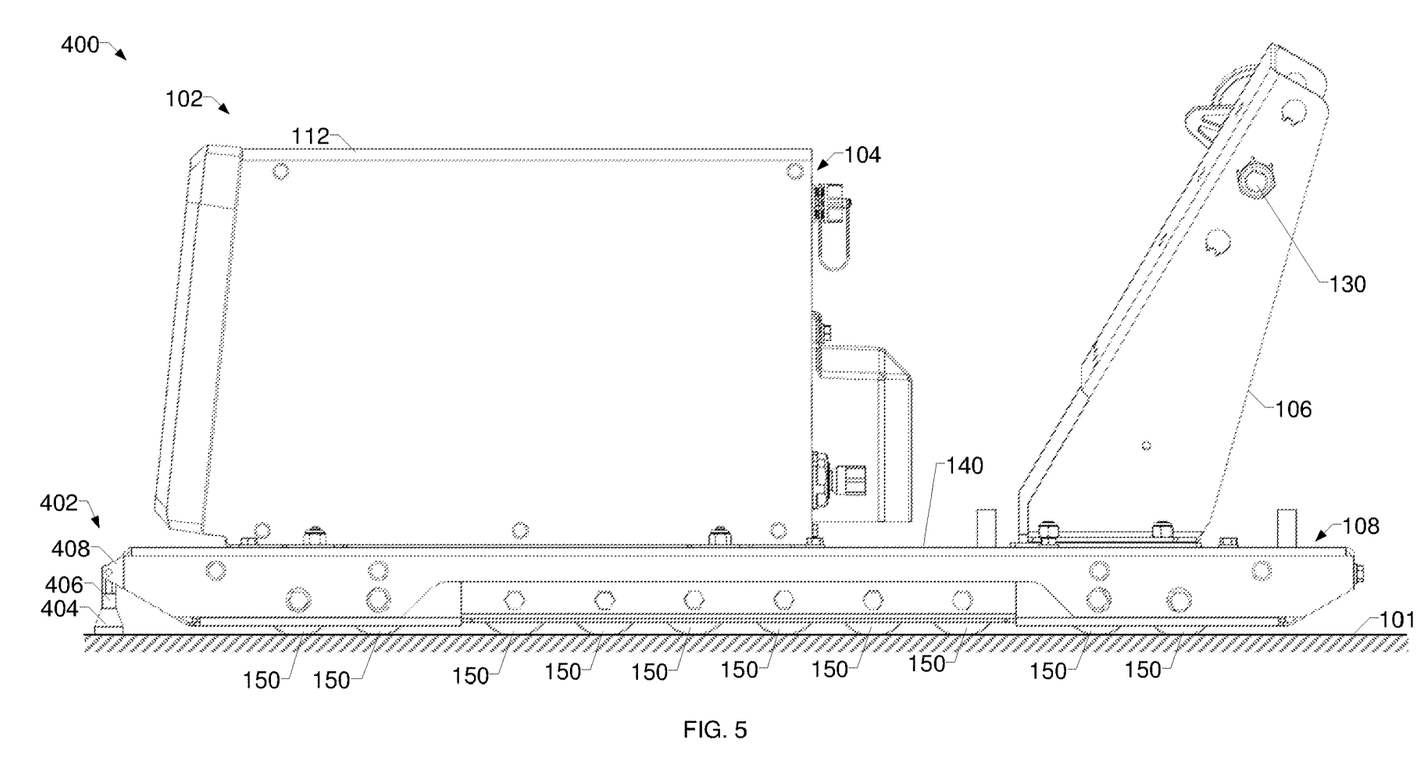
FIG. 5 is a side elevation view of the example welding system of FIG. 5 with the levered brake in a braked position.
Figure 6:
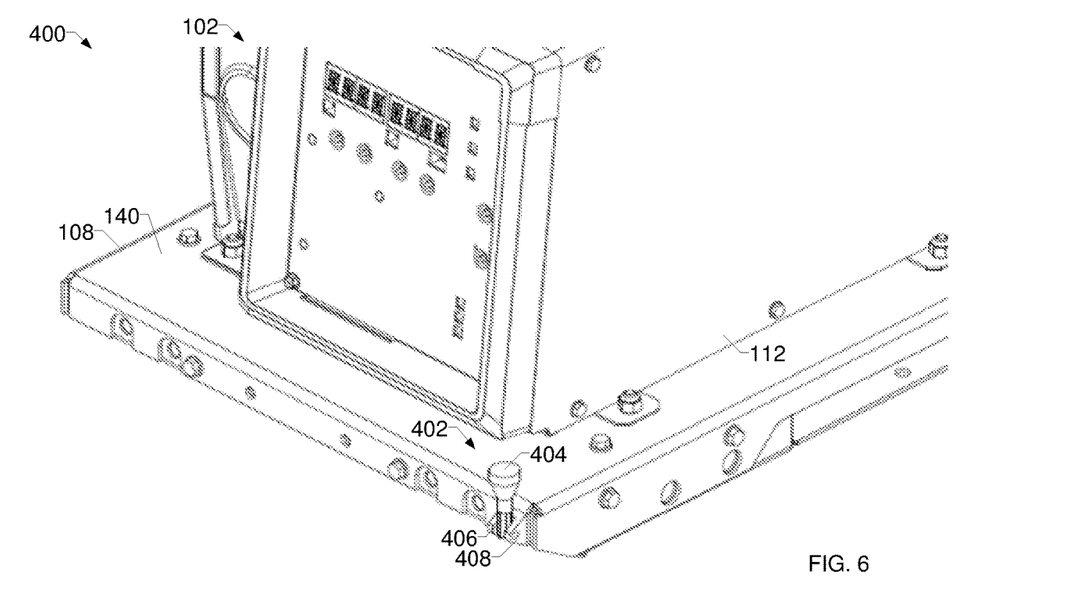
FIG. 6 is a side elevation view of the example welding system of FIG. 5 with the levered brake in the unbraked position.
Figure 7:
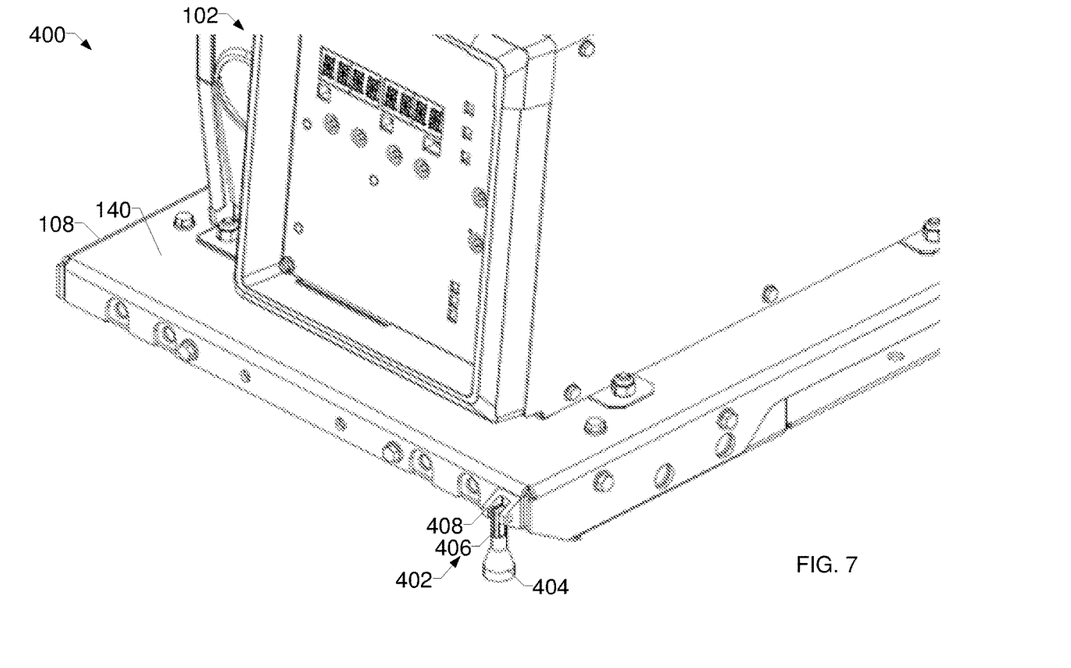
FIG. 7 is a side elevation view of the example welding system of FIG. 5 with the levered brake in the braked position.

FIG. 4 is a side elevation view of another example welding system 400 having a rolling support base with a levered brake in an unbraked position. FIG. 5 is a side elevation view of the example welding system 400 of FIG. 5 with the levered brake in a braked position. FIG. 6 is a perspective view of the example welding system 400 of FIG. 4 with the levered brake in the unbraked position. FIG. 7 is a perspective view of the example welding system 400 of FIG. 4 with the levered brake in the braked position.

The example welding system 400 is similar to the welding system 100 of FIGS. 1-3 disclosed above, and includes the wire feeder 102, the drive assembly 104, the wire supply support 106, the support base 108, the housing 112, the hub 130, the plate 140, and the rollers 150.

In addition, the example welding system 400 includes a brake 402 attached to a side of the support base 108. Instead of contacting and applying braking force to the rollers 150, the example brake 402 contacts the support surface 101 to apply a braking force using the weight of the welding system 400 to resist movement of the welding system 400.

The brake 402 of FIGS. 4-7 includes a contact pad 404 (e.g., a rubber or plastic foot, a durable and high-friction contact surface), which is attached to the support base 108 via a rotating leg 406 coupled to a mounting bracket 408. The mounting bracket 408 allows rotation of the leg 406 and the contact pad 404 between an unbraked position (e.g., FIGS. 4 and 6) and a braked position (FIGS. 5 and 7). In the braked position, the contact pad 404 is applying a braking force to the support surface 101. The operator may rotate the leg 406 from the braked position to the unbraked position to more easily move the welding system 400 on the rollers 150, and rotate the leg 406 to the braked position at the desired location to reduce the likelihood of undesired movement of the welding system 400.

In some examples, the length of the leg 406 and, therefore, the weight placed on the contact pad 404 and resulting braking force, are adjustable. For example, by increasing the length of the leg 406, the weight on the contact pad 404 is increased. As a result, the brake 402 has a higher resistance to movement of the welding system 400, but may require more force to overcome the braking position and move the brake 402 to the unbraked position. Conversely, the leg 406 may be shortened to decrease the weight on the contact pad 404, and reduce the braking force and force to move the brake 402 to the unbraked position.

In some examples, the bracket 408 and/or the leg 406 include detents or other features to improve stability of the leg 406 in the braked position without substantially increasing the weight on the contact pad 404, and/or to retain the leg 406 in the unbraked position to resist or prevent unintentional rotation of the leg 406 to the braked position while the welding system 400 is being moved.

While the example brake 402 is shown in a particular position on the support base 108, in other examples the brake 402 may be positioned at any effective location on the perimeter of the support base 108, and/or any other location on the support base 108 which allows the brake 402 to be positioned in the braked and unbraked positions. Additionally or alternatively, the contact pad 404, the leg 406, and/or the bracket 408 may have any other desired shape to contact the support surface 101 from the location at which the brake 402 is attached to the support base 108. For example, the brake 402 may be implemented using the example actuator 164, lever 168, and/or handle 170 such that the lever 168 and contact pad 162 are configured to contact the support surface 101 (e.g., in addition to or instead of contacting the rollers 150) to apply the braking force to the support surface 101 in the braked position illustrated in FIGS. 1-3.

Figure 8:
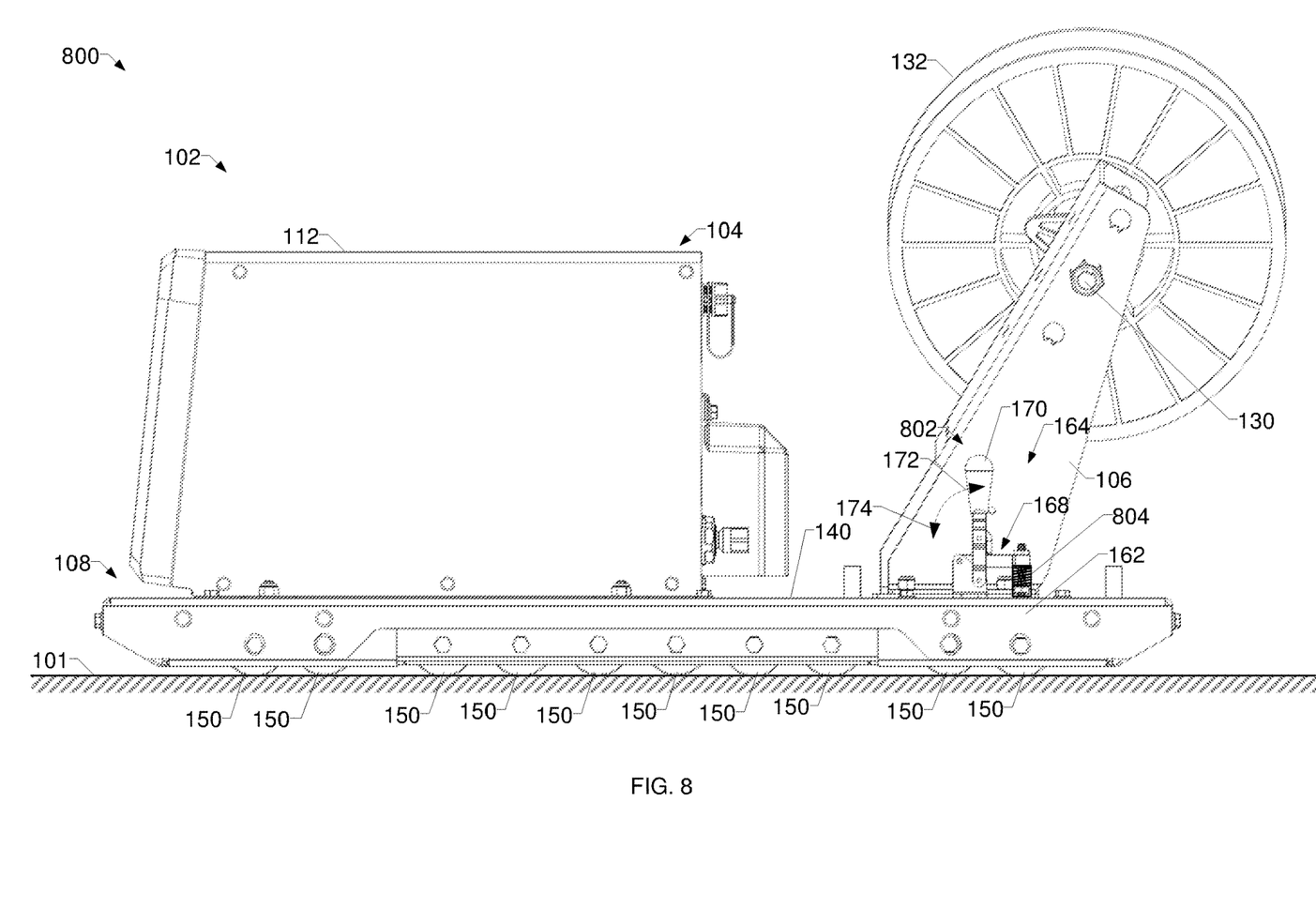
FIG. 8 is a side elevation view of an example welding system having a rolling support base with a levered brake having a biasing element, in accordance with aspects of this disclosure.

FIG. 8 is a side elevation view of an example welding system 800 having a rolling support base 108 with a levered brake 802 having a biasing element 804. The example welding system 400 is similar to the welding system 100 of FIGS. 1-3 disclosed above, and includes the wire feeder 102, the drive assembly 104, the wire supply support 106, the support base 108, the housing 112, the hub 130, the plate 140, and the rollers 150.

The example levered brake 802 is similar or identical to the example brake 160 of FIGS. 1-3, including the contact pad 162, actuator 164, lever 168, and handle 170. The example levered brake 802 further includes the biasing element 804, which biases the contact pad 162 to apply the braking force to the one or more rollers 150. The example biasing element 804 may be a spring or other biasing element which applies a force urging the contact pad 162 toward engagement or contact with the roller 150. As a result, instead of the actuator 164 rotating in the first direction 172 to apply the braking force, the actuator 164 requires a force in the second direction 174 to overcome the biasing force from the biasing element 804 to set the brake 802 to the unbraked position. The handle 170 may then be released from the unbraked position to allow the biasing element to push the contact pad 162 into contact with the roller(s) 150 and apply the braking force to the welding system 800. In this manner, if the actuator 164 becomes broken, the contact pad 162 is pushed to the braked position by default.

Figure 9:
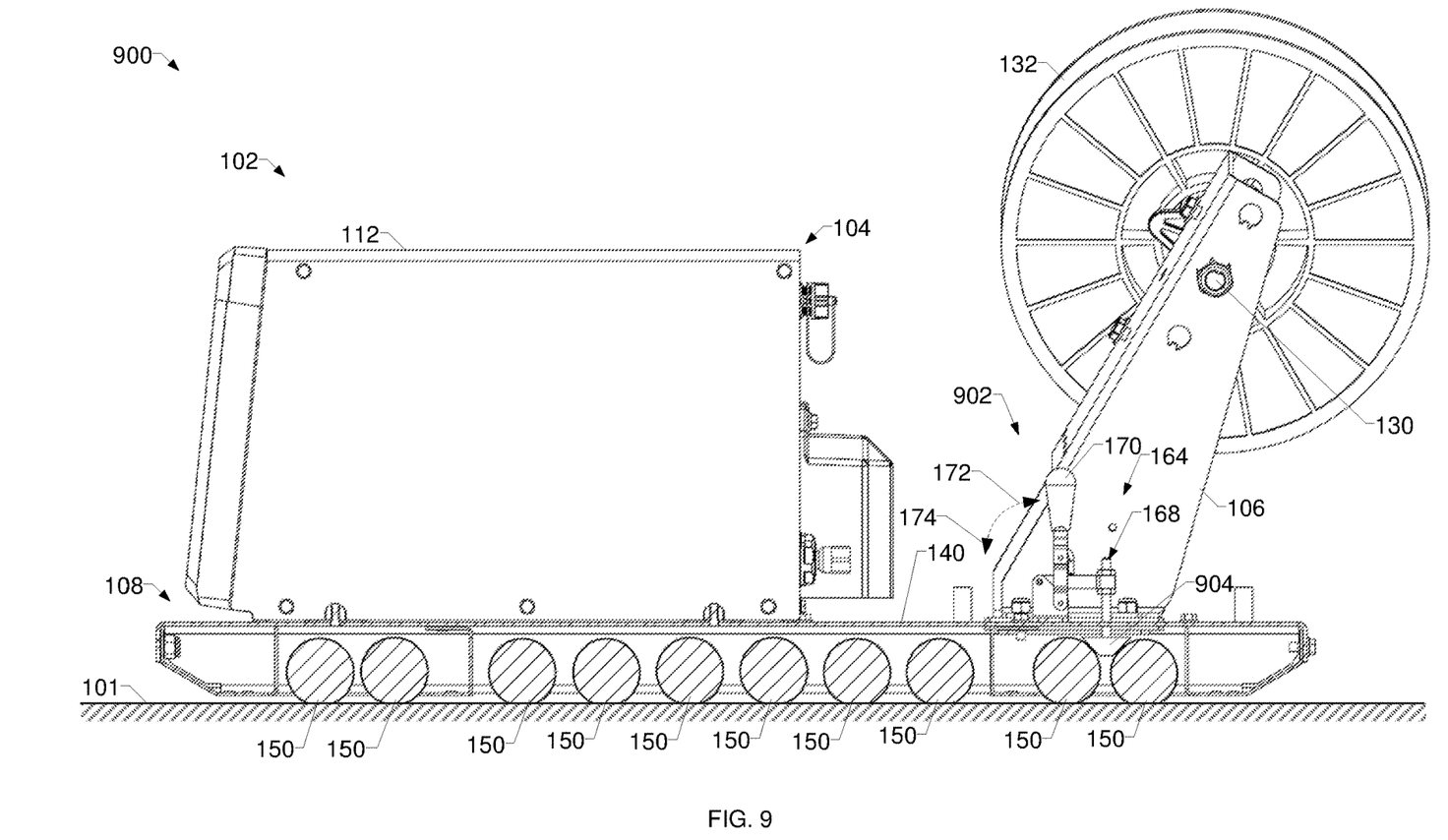
FIG. 9 is a cutaway side elevation view of another example welding system having a rolling support base with a levered brake having a wedge-shaped contact pad, in accordance with aspects of this disclosure.

FIG. 9 is a cutaway side elevation view of another example welding system 900 having a rolling support base 180 with a levered brake 902 having a wedge-shaped contact pad 902. The example welding system 900 is similar to the welding system 100 of FIGS. 1-3 disclosed above, and includes the wire feeder 102, the drive assembly 104, the wire supply support 106, the support base 108, the housing 112, the hub 130, the plate 140, and the rollers 150. The example levered brake 902 is similar or identical to the example brake 160 of FIGS. 1-3, including the actuator 164, lever 168, and handle 170. In contrast with the contact pad 162, the contact pad 904 of the example welding system 900 has a wedged or tapered surface, and abuts two adjacent rollers 150 from a position between the contacted rollers 150.

While an example wedge shape is illustrated in FIG. 9, the wedge shaped contact pad 904 may have a larger or smaller angle, and a larger or smaller width.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
   a support base comprising one or more attachment points for attachment of a wire supply and attachment of a wire drive assembly;
   a wire drive assembly attached to the support base;
   a wire supply support attached to the support base and configured to support a wire supply spool;
   a plurality of rollers coupled to a bottom of the support base; and
   a brake configured to selectively brake the welding system, wherein the brake comprises:
      a contact pad configured to selectively extend through the support base to contact one or more of the rollers; and
      an actuator accessible from a top or a side of the support base and configured to:
         actuate the contact pad to contact the one or more of the rollers to apply a braking force to the one or more of the rollers; and
         actuate the contact pad to move out of contact with the one or more of the rollers.

2. The welding system as defined in claim 1, wherein the contact pad is at least one of a flat pad configured to apply pressure against the one or more of the rollers, or a wedge configured to apply pressure to two rollers of the plurality of rollers between the two rollers.

3. The welding system as defined in claim 1, wherein the contact pad is configured to extend through at least one of a top surface of the support base or a side surface of the support base.

4. The welding system as defined in claim 1, wherein the plurality of rollers comprises at least five rollers.

5. The welding system as defined in claim 1, wherein the actuator comprises a lever configured to actuate the contact pad to contact the one or more of the rollers when a handle of the lever is pushed in a first direction to an engaged position.

6. The welding system as defined in claim 5, wherein the lever is configured to actuate the contact pad to move out of contact with the one or more of the rollers when the handle of the lever is pushed in a second direction to a released position.

7. The welding system as defined in claim 1, wherein the brake further comprises:
   a biasing element configured to bias the contact pad to apply the braking force to the one or more rollers; and
   a lever configured to disengage the contact pad from the one or more rollers when a handle of the lever is pushed in a first direction, and to allow the biasing element to move the contact pad into contact with the one or more rollers when the level is released.

\* \* \* \* \*